March 10, 1964   G. W. CRESSMAN ETAL   3,123,993
FLASH LAMP
Filed June 11, 1962   2 Sheets-Sheet 1

Inventors:
George W. Cressman
Louis A. Demchock, Jr.
by Henry T. Olsen
Their Attorney

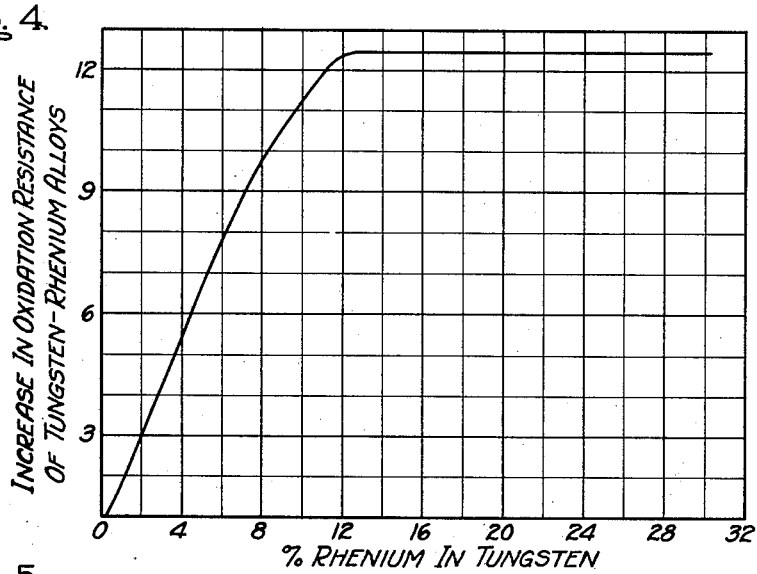
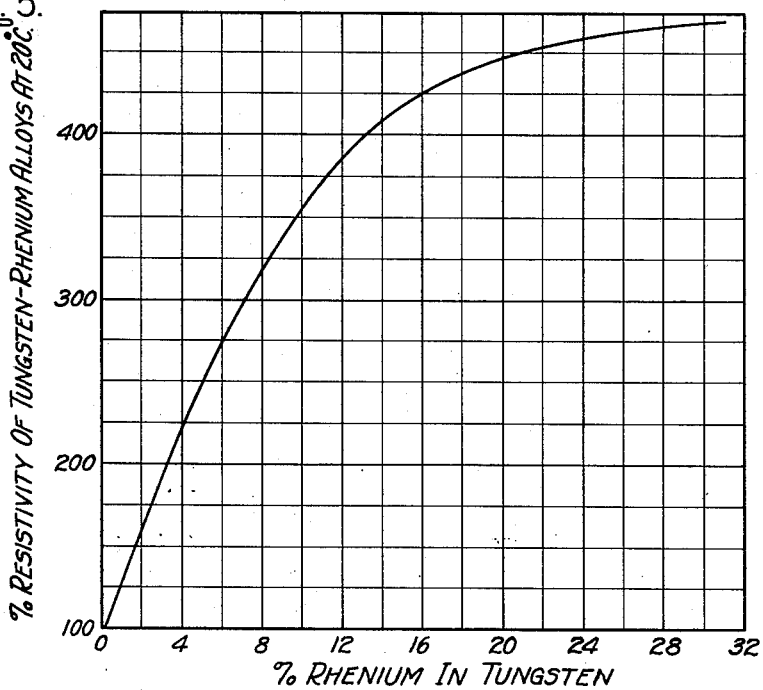

United States Patent Office 3,123,993
Patented Mar. 10, 1964

3,123,993
FLASH LAMP
George W. Cressman, Chagrin Falls, and Louis A. Demchock, Jr., Cleveland, Ohio, assignors to General Electric Company, a corporation of New York
Filed June 11, 1962, Ser. No. 201,546
3 Claims. (Cl. 67—31)

This invention relates to photoflash lamps of the type filled with combustible material ignited in a combustion supporting atmosphere by an electrically conductive filament; it relates particularly to flash lamps having an improved ignition filament by which the flashability of the lamp under various conditions of use is greatly increased.

The photoflash lamp has contributed a great deal to the art of photography because of its portability. But as with many devices, limitations in its use may sometimes arise. For example, it is exasperating for a photographer, who has laboriously assembled a group to take a picture, to have the flash lamp fail to ignite. Since flash lamps are fired by an electrical system including the camera contacts and a power source, the photographer may be at a loss to know whether the difficulty is in the lamp itself or the system which powers it. It is an object of this invention to provide an improved flash lamp which may be used with a conventional power supply system with the result that the chances of misfiring are greatly reduced.

Photoflash lamps of the type described are ignited by a filament therein which is electrically heated from a source of power to a condition sufficient to ignite the primer or the combustible filling. The power source is generally one or more primary dry cell batteries which characteristically have a limited life. One of the major causes for failure of the lamp to flash in timed relation to the camera is a weak battery—one which is incapable of providing a power pulse of short duration with enough energy to flash the lamp. The dry cell battery, as the cell becomes polarized through storage and use, acquires a high internal impedance reducing its power output and thus fails to provide sufficient energy to the filament to ignite the lamp synchronously with the opening of the camera shutter. Other power sources such as storage batteries similarly exhibit a higher impedance as the cells deteriorate. It is another object of this invention to provide an improved flash lamp which will flash with weakened as well as with new batteries.

Another recurring problem in photoflash lamps is filament burn-out, a circumstance in which the filament reaches a temperature sufficient to oxidize or burn it but not sufficient to ignite the combustible filling or primer. It is therefore a further object of the invention to provide an improved photoflash lamp having an improved ignition filament wherein the probability of filament burn-out is greatly reduced.

Briefly, the invention employs a flash lamp having a sealed envelope containing combustible material and ignition means therefor, said ignition means including an improved filament which is electrically conductive and the resistance of which more closely matches the impedance of a battery even after the battery has become weakened by shelf life or by use. In another aspect of the invention, the electrically conductive filament of the flash lamp is made of a refractory metal alloy including tungsten and rhenium in which the percentage of rhenium by weight ranges from about 0.5% to about 30% to achieve the recited objects and purposes.

Further objects and advantages of the invention will appear to one skilled in the art from the following specification in which:

FIG. 4 is a graph showing the effects of the addition of various amounts of rhenium to the oxidation resistance of the tungsten-rhenium filament; and FIG. 5 is a graph showing the increase in electrical resistance of the tungsten-rhenium filament upon addition of rhenium.

Figure 1:
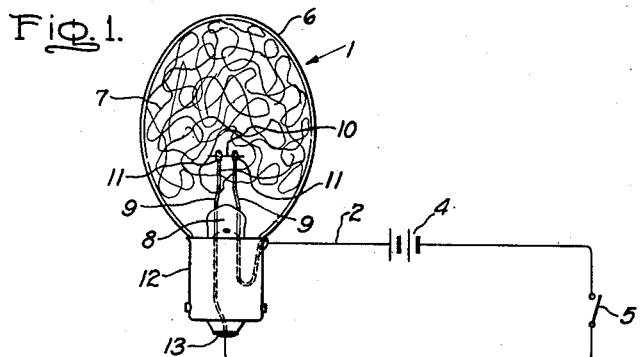
FIG. 1 shows an example of a flash lamp constructed in accordance with the invention together with a battery operating system.

As shown in FIG. 1, the new flash lamp and the system in which it is used includes a flash lamp 1 electrically connected by conductors 2 and 3 to a dry cell battery 4. A switch 5 is provided in one of the conductors 3 to close the circuit to ignite the lamp. In normal practice the switch 5 would be activated by the synchronizing operation of the camera shutter.

To produce light, flash lamp 1 is constructed with a light-transmitting glass envelope 6 filled with a quantity of filamentary combustible material 7 of aluminum, zirconium, or the like and a combustion supporting gas such as oxygen. Alternatively, combustible gases such as, for example, a mixture of cyanogen and oxygen may be used. A stem 8 supports lead-in wires 9 sealed therein. A filament 10 is connected across the internal ends of the lead-in wires to provide a conduction path. The filament and lead-in wires constitute the ignition means. As is conventional, primer beads 11 of an oxidizable metal powder, bound together with an oxidizing agent, are provided at the junction between the lead-in wires and the filament. In some conventional lamp constructions, the primer beads constitute the sole light giving material. One of the lead-in wires is electrically connected to the base 12 and the other lead wire is electrically connected to a tip 13, which is insulated from the base 12. Conductors 2 and 3 are electrically connected to the tip and the base thereby forming an electrical circuit from the battery 4 through conductor 2, base 12, lead wire 9, filament 10 and then through the other lead wire 9, the tip 13, conductor 3, switch 5, back to the battery 4. The system may include, as is well known, a capacitor which is charged by the battery and discharges to ignite the lamp.

The battery 4 is of the common dry cell type. As the battery ages, its internal resistance increases. A standard 1.5 volt battery type, known commercially as No. 835, has an initial current of 9.5 amperes at 21.1° C. and an internal resistance of 0.016 ohm; after twenty-four months, the available amperage may be reduced to 0.025 ampere and the internal resistance may have increased to 5.0 ohms when stored under field conditions. In the case of a commercial 1.5 volt battery type No. 815, the initial battery impedance is approximately 0.25 ohm.

Figure 2:
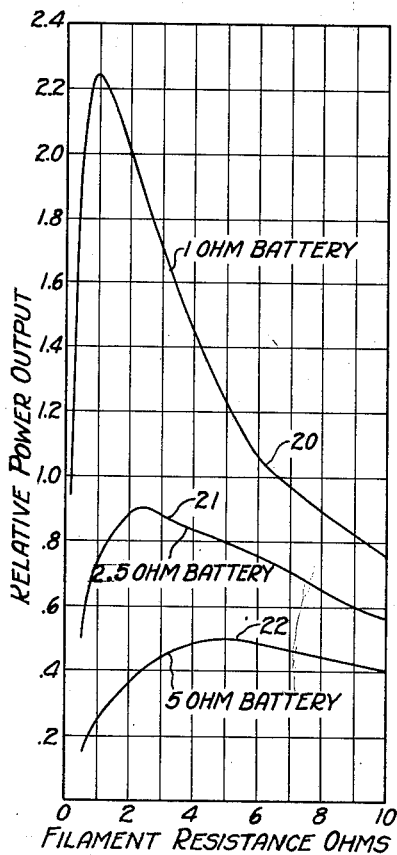
FIG. 2 is a series of curves showing the ideal relative power output of a dry cell battery at various steps during its life with respect to various resistance filaments.

As illustrative of the effect which the age and corresponding internal resistance of a battery has on the power available to a flash lamp system, FIG. 2 shows the instantaneous power delivered to filaments of varying resistances at the moment shutter contact closes. This typical series of curves shows the power delivered to an ideal load represented by the resistance of the filament in the lamp under different battery conditions. It will be noted that where the resistance of the filament more closely matches the impedance of the battery, the power output is at an optimum.

The series of power curves 20, 21 and 22 can be considered to be representative of the output to the filament at various stages in the life of a dry cell battery. Curve 20 assumes a battery having an internal impedance of approximately 1 ohm—a fresh battery. As the filament resistance is increased, from a very low value, the power transferred increases to a relative maximum of 2.3 on a scale of arbitrary numbers and then begins to decrease. Curve 20 shows that the maximum power delivered to the filament occurs when the filament has a resistance of about 1 ohm which matches the 1 ohm resistance of the battery. Similarly, curve 21 shows the effect of connecting a battery having an increased resistance of 2.5 ohms due to aging. Maximum relative power of about .9 occurs when the filament resistance is at 2.5 ohms— again matching the battery. As shown in curve 22, a battery having an internal impedance of 5 ohms provides maximum power to a 5 ohm filament. The curves apply to a constant resistance load.

It has been found to be highly desirable to increase the cold resistance of tungsten wire used in flash lamps so as to permit sufficient power to be obtained over large variations in impedance. In general, as will be noted from FIG. 2 where the internal impedance of the battery becomes too much greater than the resistance of the filament in the photoflash lamp, there is a low power draw and the battery is unable to flash the lamp or to so do only after a duration of time such as to fail to synchronize the lamp with the opening of the camera.

In accordance with the invention, the desired increase in the resistance of the tungsten filament has been obtained by alloying the tungsten with rhenium in amounts ranging from about 0.5% to 30% by weight. As shown by FIG. 5, wherein the resistivity of tungsten is taken as 100%, as the percentage of rhenium increases the electrical resistivity of the alloy filament increases sharply as compared with tungsten. For example, with 3% rheium the electrical resistance has increased by about 100%; and with 20% rhenium the increase is on the order of 450%. The values given apply at room temperature. In other words, the tungsten-rhenium alloy has a higher specific resistance than tungsten. The result is that by making the filament wire of tungsten-rhenium alloy, it is possible to provide a flash bulb filament having a greatly increased initial electrical resistance such that it more closely matches the impedance of an aging battery. For example, a 0.7 mil diameter tungsten filament used in a No. 5 flash bulb with shredded aluminum foil has a resistance of about 0.8 ohm; by use of the invention it is possible to select a 0.7 mil filament of a 97% tungsten-3% rhenium alloy having an initial cold resistance of about 1.5 ohms. This makes it possible to more closely match the resistance of the filament to the impedance of the battery to produce maximum power transfer.

As a result, the increased initial resistance of the cold tungsten-rhenium filament serves to greatly enhance the flashability properties of the flash lamp.

In matching the impedance of a flash lamp filament with the internal impedance of the battery it is not merely a question of increasing the resistance of the photoflash lamp. For example, increasing the length of the filament to add resistance increases the amount of material to be heated up by the energy from the battery thereby increasing the probability of filament burn-out without ignition. This probability exists in the case of photoflash lamps utilizing a tungsten filament because the oxidation resistance of tungsten is relatively low. As the tungsten heats up in the oxygen atmosphere provided within the flash bulb, the tungsten oxidizes or is consumed before ever reaching the temperature necessary to ignite the primer beads or combustible material—usually in the range of 400°–600° C.

In addition to the problem of having more material to heat up and drain energy from the battery, an increased length of filament provides a temperature gradient between the more distantly supported ends of the filament such that the central hottest part of the filament is not sufficiently close to the primer beads. The oxidation temperature of tungsten is approximately 400° C. and the oxidation temperature of the zirconium primer beads 11 is also approximately 400° C. Accordingly, the filament should be of as short a length as possible to provide heat transfer to the primer beads and still develop the required total heat within the lamp.

Inherent in tungsten filaments utilized in flash lamps is a positive coefficient of resistance characteristic. As the temperature of the tungsten filament increases its resistance also greatly increases. As a result, the higher the temperature of the filament as it approaches the flash lamp ignition point the more power must be supplied by the battery. Batteries weakened by use or age may well be inadequate to supply the last surge of power required to flash the lamp.

Unexpectedly it has been found that the tungsten-rhenium filament is especially suited for use in flash lamps inasmuch as the rate of its increase in resistance with temperature increase is lower than that of tungsten. Although its coefficient of resistance characteristic is positive, the slope or rate of increase is less than that of tungsten. This means that the filament can be pushed to the ignition temperature by a weaker battery.

Another advantage of the tungsten-rhenium filament as used in a flash lamp is its increased resistance to oxidation or premature burning in the lamp. As shown in FIG. 4, as the percentage of rhenium increases from 0 to about 12%, the resistance to oxidation of the alloy increases about twelve fold that of ordinary tungsten. This characteristic of the tungsten-rhenium alloy makes its use especially advantageous in flash lamps provided with a combustion supporting atmosphere such as oxygen. It becomes more difficult to oxidize or burn out the filament prematurely before the filament reaches the higher temperature of approximately 400° C. necessary to ignite the primer beads and combustible material. As a result, the chance of burn-out of the filament, without ignition of the flash lamp, is further greatly reduced.

Tungsten-rhenium alloys suitable for use as filaments in photoflash lamps have been found in which the rhenium content varies from about ½% to 30% rhenium. Less than ½% of rhenium with respect to tungsten does not substantially change the properties of the tungsten such as to increase its specific resistance, lower its thermal coefficient of resistance and increase its oxidation resistance to make it suitable for use in flash lamps. The addition of rhenium to tungsten, however, does decrease its ductility while increasing the tensile strength. More than about 30% rhenium with respect to the tungsten makes the alloy difficult to work, especially if the filament material is to be handled on automatic lamp-making machinery. Still the tungsten-rhenium wire retains the high tensile strength of tungsten wire with only a small increase in hardness.

Figure 3:
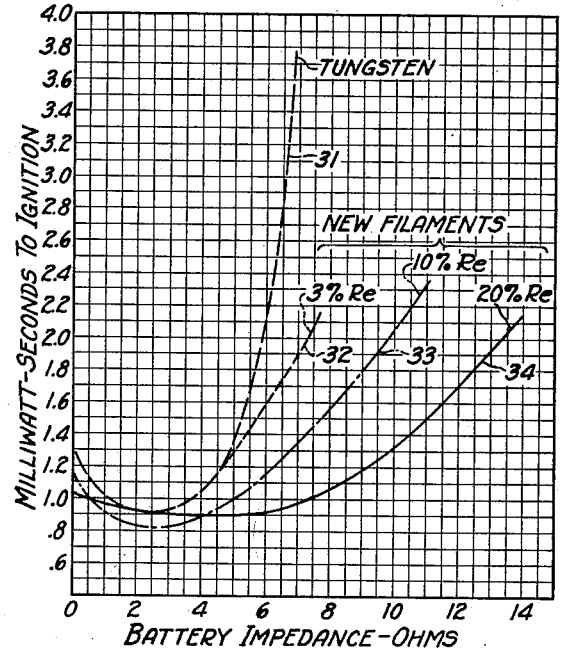
FIG. 3 is a series of curves comparing the flashability of a tungsten filament with a tungsten-rhenium filament made in accordance with the invention.

FIG. 3 illustrates a series of curves showing the energy taken to ignite flash lamps incorporating the invention of a tungsten-rhenium filament in comparison to lamps using a tungsten filament, the curves being plotted from the following data:

| Battery Impedance | Milliwattseconds For Primer Ignition | | | |
|---|---|---|---|---|
| | Tungsten | 3% Rhenium | 10% Rhenium | 20% Rhenium |
| 0.1 | 1.27 | 1.31 | 1.14 | 1.04 |
| 1.1 | 0.98 | 1.01 | 0.95 | 1.56 |
| 2.1 | 0.92 | 0.91 | 0.87 | 1.12 |
| 3.1 | 0.89 | 1.03 | 0.78 | 1.11 |
| 4.1 | 1.03 | 1.04 | 0.93 | 0.96 |
| 5.1 | 1.40 | 1.32 | 1.11 | 1.05 |
| 6.1 | 2.13 | 1.61 | 1.33 | 0.93 |
| 6.6 | 3.19 | 2.00 | 1.49 | |
| 7.1 | 3.65 | 1.93 | 1.50 | 1.04 |
| 8.1 | | 1.84 | 1.28 | 0.84 |
| 9.1 | | 1.79 | 1.38 | 1.11 |
| 10.1 | | | 2.60 | 1.48 |
| 10.6 | | | 1.99 | |
| 11.1 | | | | 1.28 |
| 12.1 | | | | 1.33 |
| 13.1 | | | | 1.97 |
| 13.6 | | | | 2.13 |

The lamps tested, as examples of the invention, were commercial No. 5 photoflash lamps, filled with shredded aluminum as the combustible material, oxygen at a pressure of about 600 mm. of mercury, and utilizing a .7 mil wire filament as described.

Curve 31 shows the energy required to ignite a photoflash lamp incorporating a tungsten wire filament. With fresh batteries the filament readily ignites in the range of 1 milliwattsecond. But when the battery impedance increases with age, the energy required rises rapidly until after about 7 ohms impedance the lamps fail to fire. On the other hand, it will be seen from curves 32, 33 and 34, which were plotted from lamps containing tungsten-rhenium filaments, that when the battery impedance exceeds about 7 ohms due to age or deterioration, the energy to ignite the lamp still remains below approximately two milliwattseconds and the flash lamps fire. As will be noted from curves 32, 33 and 34, which represent tungsten-rhenium wire having 3%, 10% and 20% rhenium, respectively, the energy required to ignite the lamp remains low, normally below two milliwattseconds depending on the percent of rhenium in the filament. For the flash to be synchronized with the camera shutter, the time for the primer to fire starting the combustion of the main lamp material generally cannot exceed approximately 10 milliseconds. As the battery becomes weakened, the energy necessary to flash the lamp and hence the time increases. However, with the addition of rhenium, the time increase is greatly reduced for weakened batteries. Thus the tungsten-rhenium filament provides a flash lamp which maintains synchronization with the camera shutter even using weakened batteries. A range of rhenium content in the alloy of about 30% provides for flashability of the lamp even with greatly weakened batteries whose internal impedance reaches about 14 ohms.

The tungsten and tungsten-rhenium alloys herein described as photoflash lamp filaments preferably employ tungsten in its commercial ductile form.

The combination of the tungsten-rhenium filament when used in flash lamps in accordance with the invention results in a higher initial resistance making it possible to more closely match the filament resistance to the impedance of a weakened battery; it provides a lower positive resistance characteristic so that a weakened battery may more easily raise the filament to the lamp ignition temperature; and it increases the oxidation resistance of the filament set in an oxidizing atmosphere within the flash lamp so that the filament does not oxidize or burn prematurely. These advantages provide an improved photoflash lamp having greatly increased flashability.

Using a tungsten-rhenium alloy in accordance with this invention, the useful life of the battery is materially increased. That is, batteries left in the camera for long periods of time under poor storage conditions and intermittent use, often found in practice, are able to properly ignite photoflash lamps using a filament of tungsten-rhenium alloy of this invention. Conversely, if the flash lamp fails to fire, the photographer is almost assured that the difficulty is a completely exhausted battery which can be easily tested for replacement. Either the lamp fires, or it fails to flash at all without burn out, which localizes the difficulty to the power source or camera and flashholder electrical system.

While the invention has been described by way of specific embodiment, it shall be understood that it may be widely modified within the spirit and scope of the invention as recited in the appended claims.

What we claim as new and desire to secure by Letters Patent of the United States is:

1. A photoflash lamp comprising a sealed light transmitting envelope, a filling of metallic combustible material and oxygen in said envelope, electrical lead wires extending into said envelope, a filament of tungsten-rhenium alloy electrically connected between and extending between said lead wires, and primer beads of combustible material carried by said lead wires and partially surrounding the filament, the rhenium in said filament ranging from about ½% to about 30% by weight of the tungsten-rhenium alloy.

2. A photoflash lamp comprising a light transmitting envelope, a quantity of light producing material in said envelope, ignition means within said envelope including a filament of tungsten-rhenium alloy for igniting said light producing material, the rhenium in said filament ranging from about ½% to about 30% by weight of the tungsten-rhenium alloy.

3. A photoflash lamp comprising a sealed light transmitting envelope, a filling of shredded metallic combustible material and oxygen in said envelope, electrical lead wires extending into said envelope, primer beads of oxidizable material carried by said lead wires, and a filament consisting of a tungsten-rhenium alloy electrically connected between said lead wires for igniting said primer beads and combustible material, the rhenium in said filament being in the range from about ½% to about 30% by weight of the tungsten-rhenium alloy.

References Cited in the file of this patent
UNITED STATES PATENTS

| | | |
|---|---|---|
| 2,756,577 | Anderson | July 31, 1956 |
| 2,949,358 | Alexander et al. | Aug. 16, 1960 |

Disclaimer 3,123,993.—*George W. Cressman*, Chagrin Falls, and *Louis A. Demchock, Jr.*, Cleveland, Ohio. FLASH LAMP. Patent dated Mar. 10, 1964. Disclaimer filed Aug. 21, 1970, by the assignee, *General Electric Company*.
Hereby enters this disclaimer to all the claims of said patent.
[*Official Gazette December 8, 1970.*]